United States Patent [19]

Plunkett

[11] Patent Number: 4,984,879
[45] Date of Patent: Jan. 15, 1991

[54] COMFORTABLE BINOCULAR

[76] Inventor: Richard A. Plunkett, 270 Clinton St., Brooklyn, N.Y. 11201

[21] Appl. No.: 468,108

[22] Filed: Jan. 22, 1990

[51] Int. Cl.⁵ .......................... G02B 7/09; G02B 7/28; G02B 23/00; G02B 27/02
[52] U.S. Cl. ..................................... 350/551; 350/145; 350/556
[58] Field of Search ............... 350/537, 545, 546, 547, 350/548, 549, 550, 551, 552, 553, 554, 555, 556, 557, 145, 582, 589, 590

[56] References Cited

U.S. PATENT DOCUMENTS 3,531,177 9/1970 Akin ..................................... 350/551
4,056,303 11/1977 Swarovski ........................... 350/551

FOREIGN PATENT DOCUMENTS 0551622 4/1923 France ................................ 350/556

Primary Examiner—Bruce Y. Arnold
Assistant Examiner—James Phan
Attorney, Agent, or Firm—Michael I. Kroll

[57] ABSTRACT

A comfortable binocular is disclosed. The comfortable binocular includes an outer cushiony binocular structure that contains a first hole and a second hole, a first telescopically adjustable lens arrangement that is readily removably disposed in the first hole of the outer binocular structure, and a second telescopically adjustable lens arrangement that is readily removably disposed in the second hole of the outer binocular structure. The first telescopically adjustable lens arrangement and the second telescopically adjustable lens arrangement are focused individually and separately from each other so as to be properly adjustable for users needing different magnifications for each eye.

17 Claims, 2 Drawing Sheets

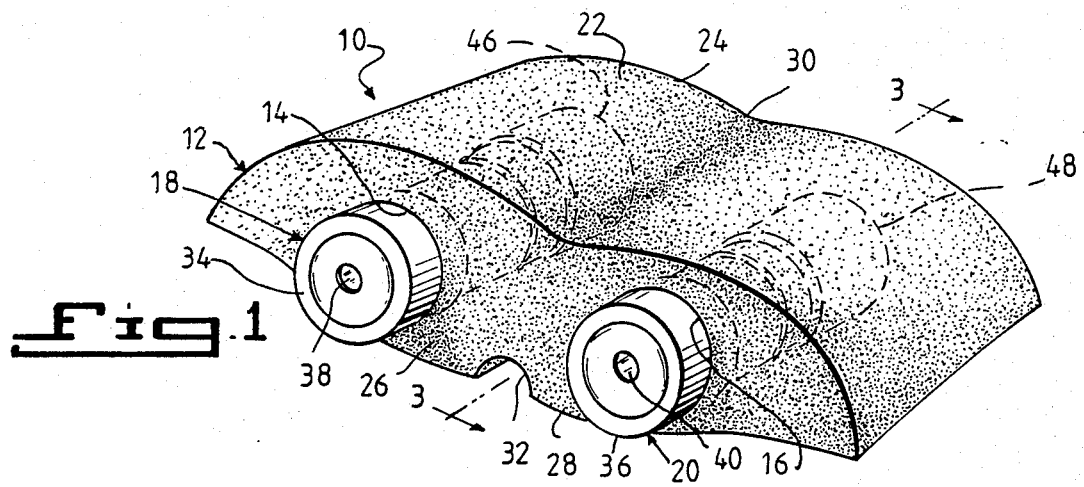
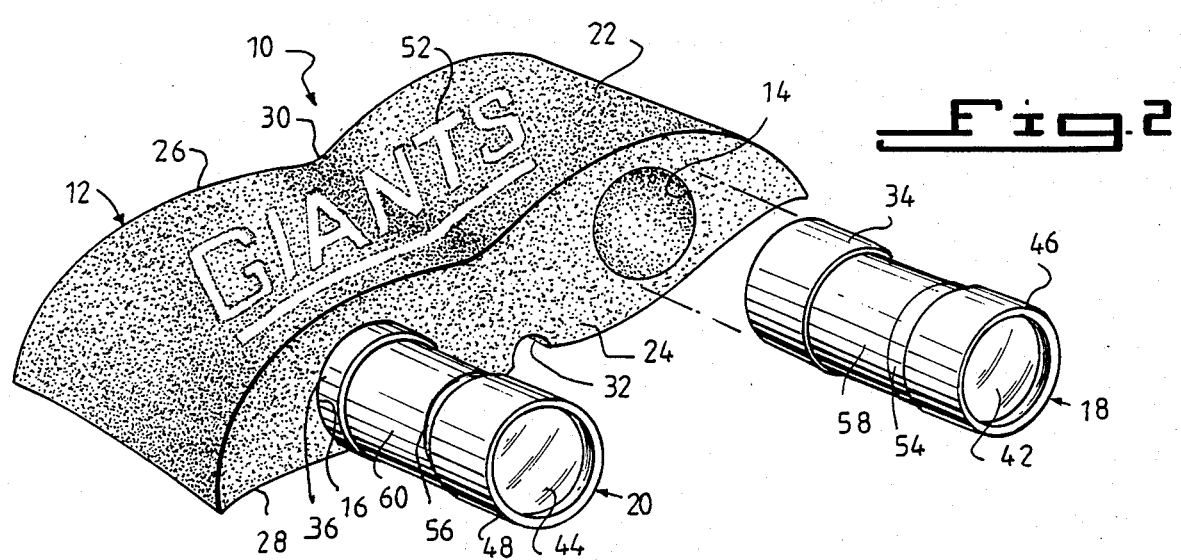
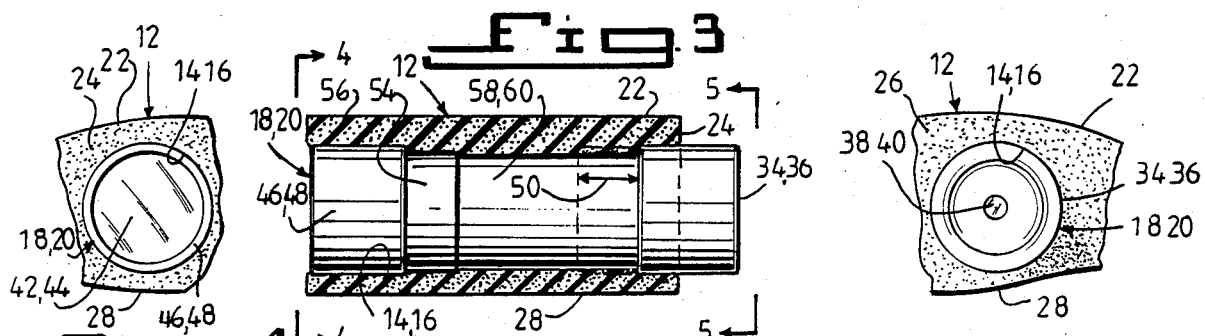
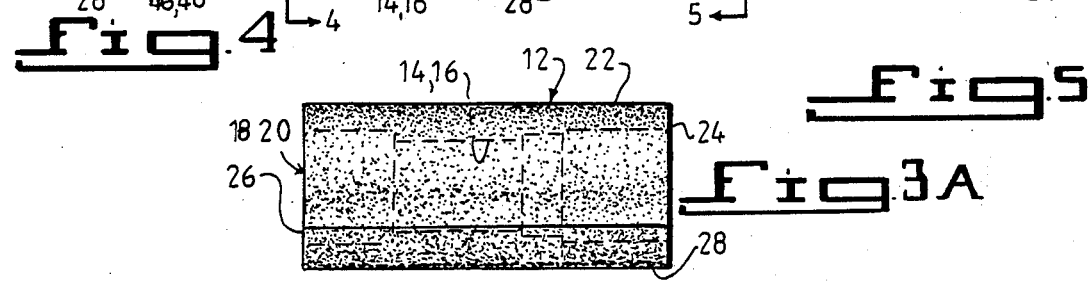

COMFORTABLE BINOCULAR

BACKGROUND OF THE INVENTION

1. Field of the Invention

The present invention relates to a binocular.

More particularly, the present invention relates to a binocular having a cushioned body containing a pair of lens arrangements that are individually and separately adjustable for focusing each eye independently, by and for the user.

2. Description of the Prior Art

Binocular instruments, an optical apparatus or instrument through which objects are viewed with both eyes. Such instruments can be conveniently dealt wit as belonging to two classes: (1) Instruments for viewing solid objects or objects in space. (2) Instruments for the presentation of plane views to both eyes for the purpose of obtaining a stereoscopic view of the subject, i.e., an impression of depth.

The natural vision is such that different central projections of the objects are communicated to both eyes, the difference of the two perspective representations arises from the fact that the projection centers are laterally displaced to an interval about equal to the distance between the eyes (the interpupillary distance). Binocular instruments should aid the natural vision with both eyes. If objects be so far distant that the two perspectives formed by the naked eye are no more distinguishable from each other, recourse may be had to binocular field glasses or telescopes, and if the objects be so small that in order to observe details on them the eyes must be brought so close to the objects that they cannot accommodate so that the images recourse may be had by binocular microscopes and magnifiers. The construction of binocular instruments dates back over several centuries and has now been brought to great perfection. The subject of their theory and history has been exhaustively treated by M. Von Rohr Die binocularen Instrumente (1907) the first publication to present a complete account of these instruments.

Numerous innovations for binoculars have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a binocular that avoids the disadvantages of the prior art.

More particularly, it is an object of the present invention to provide a binocular that allows for safe, economical binocular observation of all types of spectator entertainment. Furthermore, the present invention is durable and light-weight while allowing for close-up viewing of objects located at a distance. Additionally, the present invention is hand-held and manually operated by the user while providing lenses that are easily adjusted (focused) to obtain optimum clarity in viewing the objects located at a distance. The first longitudinally movable lens and the second longitudinally movable lens can be focused individually and separately from each other so as to be properly adjustable for users needing different magnifications for each eye.

In keeping with these objects, and with others which will become apparent hereinafter, one feature of the present invention resides, briefly stated, in a binocular, comprising, an outer cushiony binocular structure containing a first hole and a second hole, a first telescopically adjustable lens means readily removably disposed in the first hole of the outer binocular structure, and a second telescopically adjustable lens means readily removably disposed in the second hole of the outer binocular structure wherein the first telescopically adjustable lens means and the second telescopically adjustable lens means are focused individually and separately from each other.

When the comfortable binocular is designed in accordance with the present invention, proper adjustments for users needing different magnifications for each eye is provided.

In accordance with another feature of the present invention, the first telescopically adjustable lens means and the second telescopically adjustable lens means are made of plastic.

Another feature of the present invention is that the outer binocular structure has a top, a front, a rear, a bottom, and a substantially longitudinal center line.

Yet another feature of the present invention is that the outer binocular structure further has a nose relief disposed on the bottom and at the substantially longitudinally center line so that the outer binocular structure sits on the bridge of the nose of the user for support and comfort.

Still another feature of the present invention is that the outer binocular structure is durable, light weight, soft, and is die cut or mold made.

Yet still another feature of the present invention is that the outer binocular structure is made from a foam selected from the group of polyether foam, polyester foam, polyurethane foam, foam rubber, and styrofoam.

Still yet another feature of the present invention is that the first telescopically adjustable lens means include a first lens housing and liner and the second telescopically adjustable lens means include a second lens housing and liner.

Another feature of the present invention is that the first lens housing and liner and the second lens housing and liner are made of plastic.

Yet another feature of the present invention is that the first lens housing and liner and the second lens housing and liner protrude past the rear of the outer binocular structure.

Still another feature of the present invention is that the third lens housing and liner and the fourth lens housing and liner are made of plastic.

Yet still another feature of the present invention is that the third lens housing and liner and the fourth lens housing and liner remain substantially flush with the front of the outer binocular structure.

Still yet another feature of the present invention is that the first telescopically adjustable lens means further include a first stationary female ring and the second telescopically adjustable lens means include a second stationary female ring.

Another feature of the present invention is that the first stationary female ring is rigidly affixed to the third lens housing and liner and the second stationary female ring is rigidly affixed to the fourth lens housing and liner.

Yet another feature of the present invention is that the first telescopically adjustable lens means contain a first movable male shaft and the second telescopically adjustable lens means contain a second movable male shaft.

Still another feature of the present invention is that the first movable male shaft telescopes into the third lens housing and liner and the second movable male shaft telescopes into the fourth lens housing and liner.

Yet still another feature of the present invention is that the first lens housing and liner telescopes over the first movable male shaft and the second lens housing and liner telescopes over the second movable male shaft so as to form a cylindrical appearance when the first telescopically adjustable lens means and the second telescopically adjustable lens means retract.

Still yet another feature of the present invention is that the first movable male shaft is provided with a first lip and a second lip, the first lens housing and liner are provided with a third lip that mates with the second lip and the first stationary female ring is provided with a fourth lip that mates with the first lip so that the first movable male shaft is prevented from slipping out during extension, the second movable male shaft is provided with the first lip and the second lip, the second lens housing and liner are provided with the third lip that mates with the second lip, and the second stationary female ring is provided with the fourth lip that mates with the first lip so that the second movable male shaft is prevented from slipping out during extension.

Another feature of the present invention is that the first lens housing and liner contain a first longitudinally movable lens that is made of plastic and/or glass and the second lens housing and liner contain a second longitudinally movable lens that is made of plastic and/or glass.

Yet another feature of the present invention is that the first longitudinally movable lens and the second longitudinally movable lens are adjustable for proper focus among the various users, the first longitudinally movable lens and the second longitudinally movable lens are focused individually and separately from each other so as to be properly adjustable for users needing different magnifications for each eye.

Still another feature of the present invention is that the first longitudinally stationary lens and the second longitudinally stationary lens are substantially flush with the front of the outer binocular structure.

Yet still another feature of the present invention is that the top of the outer binocular structure contains any desired name and/or logo.

Still yet another feature of the present invention is that the any desired name and/or logo is silk-screened in place.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a rear perspective view of the present invention showing the telescopically adjustable lens means inserted into the outer binocular structure with the telescopically adjustable lens means protruding from the rear of the outer binocular structure;

FIG. 2 is a front perspective view of the present invention showing the telescopically adjustable lens means being inserted into the outer binocular structure and a silk screened name and/or logo can be located on the top of the outer binocular structure;

FIG. 3 is a longitudinal cross sectional view of the present invention taken along line 3—3 of FIG. 1;

FIG. 3A is a side view of the present invention showing the telescopically adjustable lens means in phantom;

FIG. 4 is a front view of the present invention taken along line 4—4 of FIG. 3;

FIG. 5 is a rear view of the present invention taken along line 5—5 of FIG. 3;

LIST OF REFERENCE NUMERALS UTILIZED IN THE DRAWING

Figure 6:
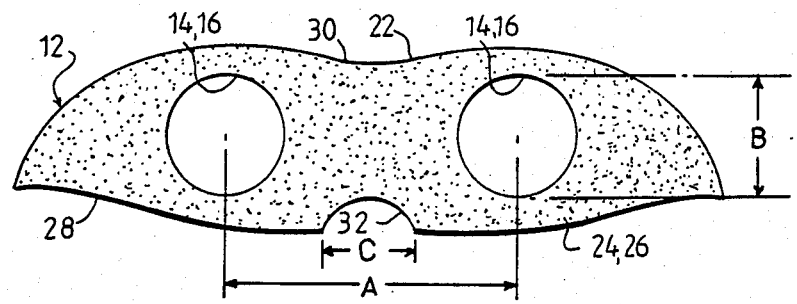
FIG. 6 is a front or back view of the outer binocular structure of the present invention.
Figure 7:
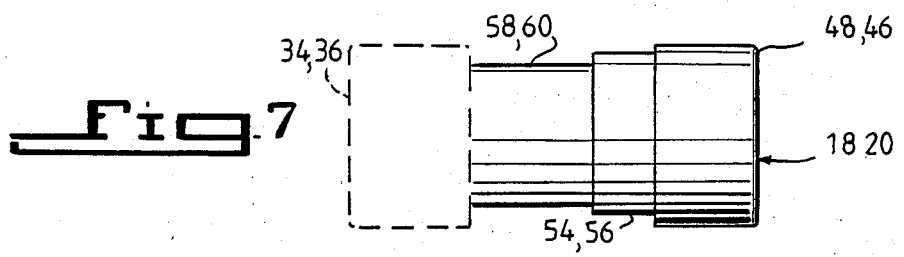
FIG. 7 is a side view, in partial phantom, of the telescopically adjustable lens means of the present invention.
Figure 8:
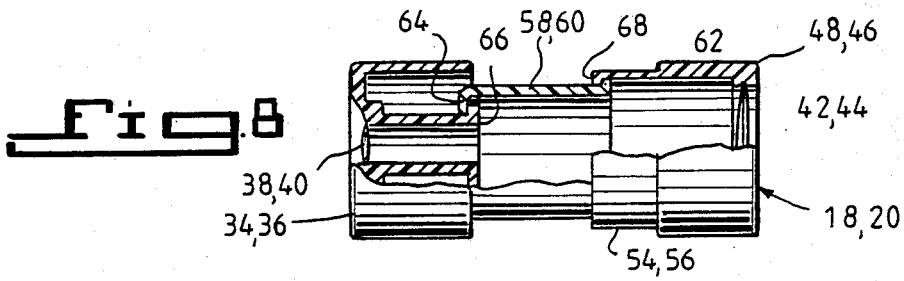
FIG. 8 is a side view, in partial cross-section, of the telescopically adjustable lens means of the present invention.
Figure 9:
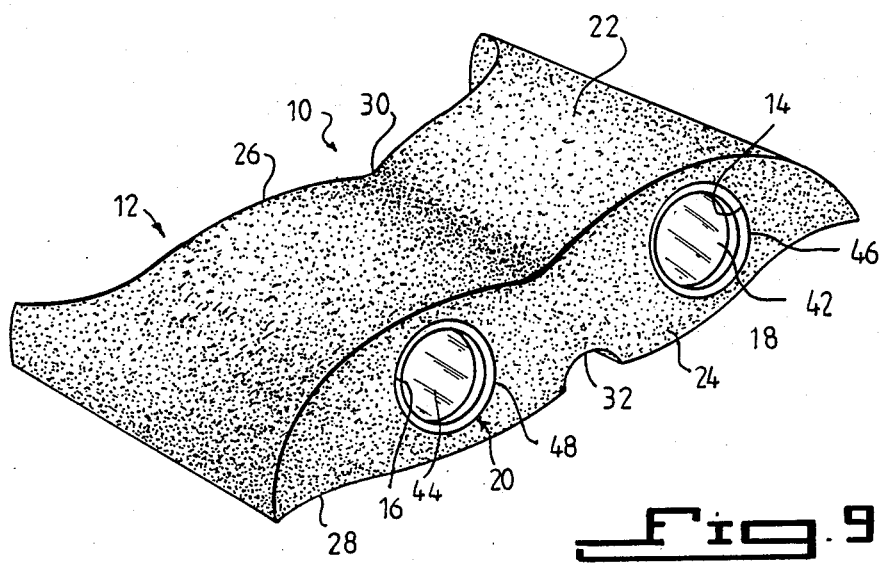
FIG. 9 is a front perspective view of the present invention showing the telescopically adjustable lens means inserted into the outer binocular structure with the telescopically adjustable lens means being flush with the front of the outer binocular structure.

10—comfortable binocular of the present invention
12—outer binocular structure of the comfortable binocular 10
14—first hole of the outer binocular structure 12
16—second hole of the outer binocular structure 12
18—first telescopically adjustable lens means of the comfortable binocular 10
20—second telescopically adjustable lens means of the comfortable binocular 10
22—top of the outer binocular structure 12
24—front of the outer binocular structure 12
26—rear of the outer binocular structure 12
28—bottom of the outer binocular structure 12
30—approximate longitudinal center of the outer binocular structure 12
32—nose relief of the outer binocular structure 12
34—first lens housing and liner
36—second lens housing and liner
38—first longitudinally movable lens
40—second longitudinally movable lens
42—first longitudinally stationary lens
44—second longitudinally stationary lens
46—third lens housing and liner
48—fourth lens housing and liner
50—arrow indicating range of motion for telescopic adjustment
52—silk screened name and/or logo
54—first stationary female ring
56—second stationary female ring
58—first movable male shaft
60—second movable male shaft
62—first lip
64—second lip
66—third lip
68—fourth lip
A—distance from the center of the first hole 14 to the center of the second hole 16
B—diameter of the first hole 14 and the second hole 16
C—width of the nose relief 32

DETAILED DESCRIPTION OF THE PREFERRED EMBODIMENT

Referring now to the FIGURES, where like numerals indicate like parts. The comfortable binocular of the present invention is shown generally at 10 and includes an outer binocular structure 12. The outer binocular structure 12 contains a first hole 14 and a second hole 16. A first telescopically adjustable lens means 18 is disposed in the first hole 14 of the outer binocular structure 12. And, a second telescopically adjustable lens means 20 is disposed in the second hole 16 of the outer binocular structure 12, as shown. The first telescopically adjustable lens means 18 and the second telescopically adjustable lens means 20 can be made of plastic, but it is not limited to it.

The outer binocular structure 12 cushions the comfortable binocular 10 of the present invention and includes a top 22, a front 24, a back 26, and a bottom 28. Contained on the bottom 28, at its approximate longitudinal center 30, is a nose relief 32 that sits on the bridge (not shown) of the nose (not shown) for support and comfort.

Further, the outer binocular structure 12 is lightweight, soft, and is die cut or mold made from one or more of the following types of foam: polyether foam, polyester foam, polyurethane foam, foam rubber, and styrofoam.

As can be seen, the first lens housing and liner 34 and the second lens housing and liner 36 are made of plastic, but are not limited to it. The first lens housing and liner 34 and the second lens housing and liner 36 protrude past the rear 26 of the outer binocular structure 12. The third lens housing and liner 46 and the fourth lens housing and liner 48 are also made of plastic, but are not limited to it, and remain flush with the front 24 of the outer binocular structure 12.

The first telescopically adjustable lens means 18 and the second telescopically adjustable lens means 20, each further contain a first stationary female ring 54 and a second stationary female ring 56, respectively. The first female ring 54 and the second female ring 56 are rigidly affixed to the third lens housing and liner 46 and the fourth lens housing and liner 48, respectively.

Additionally, the first telescopically adjustable lens means 18 and the second telescopically adjustable lens means 20, each further contain a first movable male shaft 58 and a second movable male shaft 60. The first movable male shaft 58 and the second movable male shaft 60 each telescope into the third lens housing and liner 46 and the fourth lens housing and liner 48, respectively. The first lens housing and liner 34 and the second lens housing and liner 36, respectively, telescope over the first movable male shaft and the second movable male shaft 60, respectively, so as to form a cylindrical appearance when the first telescopically adjustable lens means 18 and the second telescopically adjustable lens means 20 retract.

In order to prevent the first movable male shaft 58 and the second movable male shaft 60 from slipping out during extension, the first movable male shaft 58 and the second movable male shaft 60 are each provided with a first lip 62, and a second lip 64. The first lens housing and liner 34 and the second lens housing and liner 36, respectively, are provided with a third lip 66 that mates with the second lip 64, but are not limited to it. The first stationary female ring 54 and the second stationary female ring 56, respectively, are provided with a fourth lip 68 that mates with the first lip 62.

Additionally, the first longitudinally movable lens 38 and the second longitudinally movable lens 40 are made of plastic and/or glass and are movable in the direction of arrow 50. The first longitudinally movable lens 38 and the second longitudinally movable lens 40 and are movably disposed in the first telescopically adjustable lens means 18 and the second telescopically adjustable lens means 20, respectively, so that the first longitudinally movable lens 38 and the second longitudinally movable lens 40 can be adjusted for proper focus among the various users.

The first longitudinally movable lens 38 and the second longitudinally movable lens 40 can be focused individually and separately from each other so as to be properly adjustable for users needing different magnifications for each eye.

The first longitudinally stationary lens 42 and the second longitudinally stationary lens 44 are made of plastic and/or glass, but are not limited to it, and are stationarily disposed in the first telescopically adjustable lens means 18 and the second telescopically adjustable lens means 20, respectively, so that the first longitudinally stationary lens 42 and the second longitudinally stationary lens 44, are substantially flush with the front 24 of the outer binocular structure 12.

Further, as shown, any desired name and/or logo 52 can be silk screened on to the top 22 of the outer binocular structure 12.

As shown, the distance between the centers of the holes 14,16 are designated "A" and depend upon the user. The diameter of the holes 14, 16 are designated "B" and depend upon the optics used for insertion. The width of the nose relief 32 is designated "C" and provides comfort and support for the user.

It will be understood that each of the elements described above, or two or more together, may also find a useful application in other types of constructions differing from the type described above.

While the invention has been illustrated and described as embodied in comfortable binocular, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A binocular, comprising:
   (a) an outer cushion binocular structure containing a first hole and a second hole, said outer binocular structure has a top, a front, a rear, a bottom, and a substantial longitudinal center line, said outer binocular structure further contains a nose relief being disposed on said bottom and at said substantial longitudinal center line so that said outer binocular structure sits on the bridge of the nose of the user for support and comfort, said outer binocular structure is durable, light weight, soft, and is die cut or mold made, said outer binocular structure is made of foam selected from the group of polyether foam, polyester foam, polyurethane foam, foam rubber, and styrofoam;

(b) a first telescopically adjustable lens means readily removably disposed in said first hole of said outer binocular structure, said first telescopically adjustable lens means and said second telescopically adjustable lens means are made of plastic; and (c) a second telescopically adjustable lens means readily removably disposed in said second hole of said outer binocular structure, said first telescopically adjustable lens means and said second telescopically adjustable lens means being focused individually and separately from each other so as to be properly adjustable for users needing different magnifications for each eye.

2. A binocular as defined in claim 1, wherein said first telescopically adjustable lens means include a first lens housing and liner, said second telescopically adjustable lens means include a second lens housing and liner.

3. A binocular as defined in claim 2, wherein said first lens housing and liner and said second lens housing and liner are made of plastic.

4. A binocular as defined in claim 3, wherein said first lens housing and liner and said second lens housing and liner protrude past said rear of said outer binocular structure.

5. A binocular as defined in claim 4; further comprising a third lens housing and liner and a fourth lens housing and liner which are made from plastic.

6. A binocular as defined in claim 5, wherein said third lens housing and liner and said fourth lens housing and liner remain substantially flush with said front of said outer binocular structure.

7. A binocular as defined in claim 6, wherein said first telescopically adjustable lens means further include a first stationary female ring, said second telescopically adjustable lens means further include a second stationary female ring.

8. A binocular as defined in claim 7, wherein said first stationary female ring is rigidly affixed to said third lens housing and liner, said second stationary female ring is rigidly affixed to said fourth lens housing and liner.

9. A binocular as defined in claim 8, wherein said first telescopically adjustable lens means contain a first movable male shaft, said second telescopically adjustable lens means contain a second movable male shaft.

10. A binocular as defined in claim 9, wherein said first movable male shaft telescopes into said third lens housing and liner, said second movable male shaft telescopes into said fourth lens housing and liner.

11. A binocular as defined in claim 10, wherein said first lens housing and liner telescopes over said first movable male shaft, said second lens housing and liner telescopes over said second movable male shaft so as to form a cylindrical appearance when said first telescopically adjustable lens means and said second telescopically adjustable lens means retract.

12. A bincoular as defined in claim 11, wherein said first movable male shaft is provided with a first first lip and a first second lip, said first first lens housing and liner are provided with a first third lip that mates with said second lip, and said first first stationary female ring is provided with a first fourth lip that mates with said first first lip so that said first movable male shaft is prevented from slipping out during extension, said second movable male shaft is provided with a second first lip and said second second lip, said second second lens housing and liner are provided with said third lip that mates with said second second lip, said second second stationary female ring is provided with a second fourth lip that mates with said second first lip so that said second movable male shaft is prevented from slipping out during extension.

13. A binocular as defined in claim 12, wherein said first lens housing and liner contain a first longitudinally movable lens that is made of plastic and/or glass, said second lens housing and liner contain a second longitudinally movable lens that is made of plastic and/or glass.

14. A binocular as defined in claim 13, wherein said first longitudinally movable lens and said second longitudinally movable lens are adjustable for proper focus among the various users, said first longitudinally movable lens and said second longitudinally movable lens are focused individually and separately from each other so as to be properly adjustable for users needing different magnifications for each eye.

15. A binocular as defined in claim 14, wherein said first longitudinally stationary lens and said second longitudinally stationary lens are substantially flush with said front of said outer binocular structure.

16. A binocular as defined in claim 15, wherein said top of said outer binocular structure contains any desired name and/or logo.

17. A binocular as defined in claim 16, wherein said any desired name and/or logo is silkscreened in place.

* * * * *